(12) United States Patent
Wanibuchi (10) Patent No.: US 11,708,664 B2
(45) Date of Patent: Jul. 25, 2023

(54) SYNTHETIC LEATHER AND METHOD FOR PRODUCING THE SAME

(71) Applicant: SEIREN CO., LTD., Fukui (JP)

(72) Inventor: Yusuke Wanibuchi, Fukui (JP)

(73) Assignee: Seiren Co., Ltd., Fukui (JP)

( * ) Notice: Subject to any disclaimer, the term of this patent is extended or adjusted under 35 U.S.C. 154(b) by 743 days.

(21) Appl. No.: 16/667,011

(22) Filed: Oct. 29, 2019

(65) Prior Publication Data

US 2020/0141052 A1 May 7, 2020

(30) Foreign Application Priority Data

Nov. 6, 2018 (JP) ................. 2018-208743

(51) Int. Cl.

| | | |
|---|---|---|
| *D06M 15/27* | (2006.01) | |
| *B32B 27/00* | (2006.01) | |
| *D06M 15/277* | (2006.01) | |
| *C14C 11/00* | (2006.01) | |
| *C08G 18/62* | (2006.01) | |
| *D06N 3/14* | (2006.01) | |
| *B32B 27/40* | (2006.01) | |
| *C09D 175/04* | (2006.01) | |

(52) U.S. Cl.
CPC .......... *D06M 15/277* (2013.01); *B32B 27/00* (2013.01); *B32B 27/40* (2013.01); *C08G 18/6279* (2013.01); *C14C 11/006* (2013.01); *D06N 3/14* (2013.01); *C09D 175/04* (2013.01); *D06M 2200/01* (2013.01); *D06N 2211/28* (2013.01)

(58) Field of Classification Search
CPC .. D06M 15/277; D06M 2200/01; D06N 3/14; B32B 27/00; B32B 27/40

See application file for complete search history.

(56) References Cited

U.S. PATENT DOCUMENTS

| | | | | |
|---|---|---|---|---|
| 2014/0170917 A1* | 6/2014 | Jariwala | .................. | D06N 3/14 |
| | | | | 528/70 |
| 2018/0281364 A1* | 10/2018 | Uemura | .................. | B32B 27/20 |

FOREIGN PATENT DOCUMENTS

| | | | | |
|---|---|---|---|---|
| CN | 103696272 A | 4/2014 | | |
| EP | 1123981 B1 | 2/2004 | | |
| JP | 2007314919 A | 12/2007 | | |
| JP | 2008308785 A | * 12/2008 | ............... | D06N 3/14 |
| JP | 2010180363 A | 8/2010 | | |
| JP | 2015214773 A | 12/2015 | | |
| JP | 2008308785 A | 12/2018 | | |
| WO | 2012046878 A1 | 2/2014 | | |
| WO | 2015059924 A1 | 3/2017 | | |

OTHER PUBLICATIONS

JP-2008308785_12-2008_English Translation.*

* cited by examiner

*Primary Examiner* — Michael L Leonard
(74) *Attorney, Agent, or Firm* — Stinson LLP (57) ABSTRACT

A synthetic leather comprising a substrate, a skin layer that is disposed on one main surface of the substrate, and an anti-stain layer that is disposed to cover the skin layer. The anti-stain layer contains a base resin that comprises silicon and a unit derived from a compound that has a urethane bond. In the anti-stain layer, a fluorine atom/silicon atom atomic ratio, which is a proportion of a fluorine atom to the silicon atom, is 0.01 or less. A first color difference $\Delta E1^*$ between before and after a stain adhesion test performed on the synthetic leather rubbed under a specific condition is 5 or less.

7 Claims, 3 Drawing Sheets

SYNTHETIC LEATHER AND METHOD FOR PRODUCING THE SAME

CROSS REFERENCE TO RELATED APPLICATION

The present application is based on and claims priority to Japanese Patent Application No. 2018-208743 filed on Nov. 6, 2018 of which the entire content is incorporated herein by reference into the present application.

FIELD OF THE INVENTION

The present invention relates to a synthetic leather and a method for producing the same, and more particularly to an improvement in anti-stain properties.

BACKGROUND

Conventionally, synthetic leather in which a resin layer is laminated on a substrate is used in various fields. Usually, synthetic leather cannot be washed easily, and thus a problem of stain arises when it is used for a long period of time.

Accordingly, in order to improve the anti-stain properties of synthetic leather, a method has been proposed in which leather is covered with a coating layer containing fluorine resin as described in Japanese Laid-Open Patent Publication No. 2000-54000

A leather coating layer containing fluorine resin is easily hardened, and the texture easily deteriorates. Also, anti-stain properties are likely to deteriorate when fluorine resin is used for a long period of time.

SUMMARY OF THE INVENTION

The present invention relates to a synthetic leather including: a substrate; a skin layer that is disposed on one main surface of the substrate; and an anti-stain layer that is disposed to cover the skin layer. The anti-stain layer contains a base resin. The base resin has a silicon atom and a unit derived from a compound that has a urethane bond. In the anti-stain layer, a fluorine atom/silicon atom atomic ratio, which is a proportion of a fluorine atom to the silicon atom, is 0.01 or less. Herein, a first color difference $\Delta E1^*$ between a first synthetic leather and a second synthetic leather measured by using a spectrocolorimeter is 5 or less. The first synthetic leather is an abraded synthetic leather obtained by subjecting the synthetic leather to 10000 double rubs at a cycle of 60 times/min under a load of 19.6 N with an abrasion distance of 140 mm in accordance with JASO M 403/88, and the second synthetic leather being a stained synthetic leather obtained by fixing the first synthetic leather to a martindale testing machine conforming to ISO 12947-1 and rubbing the first synthetic leather 500 times under a load 12 kPa by using an abrader to which a piece of denim whose water content has been adjusted to 65±2 mass % and that has a color difference $\Delta E^*$ from the synthetic leather of 50 or more is attached.

Also, the present invention relates to a method for producing a synthetic leather, the method including: a first preparation step of preparing a substrate and a skin layer resin composition; a second preparation step of preparing an anti-stain layer resin composition; a skin layer forming step of forming a skin layer that contains the skin layer resin composition on one main surface of the substrate; and an anti-stain layer forming step of forming an anti-stain layer that contains the anti-stain layer resin composition to cover the skin layer, wherein the anti-stain layer resin composition contains a raw resin that contains a compound that has an urethane bond, a silicon-containing compound, and a cross-linking agent that bonds the raw resin and the silicon-containing compound.

According to the present invention, a synthetic leather that has a good texture and whose anti-stain properties are maintained over a long period of time can be obtained.

DESCRIPTION OF EMBODIMENT

The synthetic leather according to the present embodiment includes: a substrate; a skin layer that is disposed on one main surface of the substrate; and an anti-stain layer that is disposed to cover the skin layer. The anti-stain layer contains a base resin, and the base resin has a silicon atom and a unit derived from a compound that has a urethane bond.

The silicon atom is derived from, for example, a silicon-containing compound.

The anti-stain layer may contain a fluorine atom, but the proportion of the fluorine atom to the silicon atom: fluorine atom/silicon atom atomic ratio is 0.01 or less. That is, the amount of fluorine atom in the anti-stain layer is sufficiently smaller than the amount of silicon atom. The fluorine atom is derived from, for example, a fluorine resin. The anti-stain properties of conventional synthetic leather are achieved primarily by utilizing the water repellency and the oil repellency of the fluorine resin. On the other hand, with the synthetic leather according to the present embodiment, the anti-stain properties are implemented primarily by utilizing the characteristics of the silicon-containing compound, rather than the fluorine resin. The silicon-containing compound lowers the surface energy of the anti-stain layer and suppresses an adhesion of stains. Furthermore, with the use of the silicon-containing compound, even if a stain adheres to the anti-stain layer, the stain is easily removed. In addition, because the amount of fluorine resin is small, the texture of the synthetic leather is more unlikely to deteriorate.

Inherently, the silicon-containing compound contained in a layer made of resin such as a fluorine resin is likely to bleed out of the resin layer, and thus the anti-stain properties are likely to deteriorate when it is used for a long period of time. However, the anti-stain properties of the synthetic leather according to the present embodiment are maintained over a long period of time. That is, the anti-stain properties of the synthetic leather are maintained even after the synthetic leather is subjected to an abrasion test described below. As used herein, the term "anti-stain properties" refers to the resistance of adhesion of stains (stain adhesion resistance) and the ease of removal of stains (stain removability). The term "bleed out" refers to a phenomenon in which a substance floats to a layer surface or leaches out to a layer surface.

Abrasion test is performed by subjecting a test piece of synthetic leather to 10000 double rubs at a cycle of 60 times/min under a load of 19.6 N with an abrasion distance of 140 mm by using a plane abrasion testing machine (Method B) for cloth material for a top skin sheet JASO M403/88 specified by Society of Automotive Engineers of Japan, Inc. that is a public interest incorporated association.

Specifically, the abrasion test is performed in the manner described below.

A circular test piece of synthetic leather that has a diameter of 150 mm is overlaid on a urethane foam that has been cut to have the same size as the test piece and has a thickness of 10 mm, and attached to a T-type plane abrasion testing machine (available from, for example, Daiei Kagaku Seiki Mfg. Co., Ltd.) by using a double-sided adhesive tape. At this time, the urethane foam is placed between the test piece of synthetic leather and the testing machine. An abrader of the testing machine is covered with a piece of cotton cloth (No. 6 canvas) and fixed with an attachment jig. The test piece of synthetic leather is subjected to 10000 double rubs at a cycle of 60 times/min with an abrasion distance 140 mm while applying a load of 19.6 N to the abrader. As the urethane foam, a urethane foam that has a thickness of 10±1 mm and a 20% compression stress of 0.79 to 1.08 N/cm$^2$ (0.08 to 0.11 kgf/cm$^2$) as specified in the plane abrasion testing machine (Method B) for cloth material for a top skin sheet JASO M403/88. The density of the urethane foam may be 0.02±0.002 g/cm$^2$.

The synthetic leather that has been abraded in the manner described above is defined as a first synthetic leather.

The first synthetic leather is subjected to a stain adhesion test. The first synthetic leather (that has a circular shape with a diameter of 150 mm) is fixed to a martindale testing machine that conforms to ISO 12947-1, and rubbed 500 times under a load of 12 kPa by using an abrader to which a piece of denim whose water content has been adjusted to 65±2 mass % and that has a color difference E* from the synthetic leather of 50 or more is attached. In this way, a second synthetic leather stained with the dye of the denim is obtained.

Specifically, the stain adhesion test is performed in the manner described below.

Two pieces of denim (2550Y, available from Testfabrics, Inc.) that has been cut to have a diameter of 40 mm are placed on the bottom of a beaker filled with distilled water and immersed for 30 seconds. Water droplets on the pieces of denim taken out from the beaker are lightly wiped off with a pulper, and the water content of the two pieces of denim is adjusted to 65±2 mass %.

Next, the first synthetic leather is fixed to a test table of a martindale testing machine (available from, for example, Groz Beckert Japan K. K.) that conforms to ISO 12947-1 by using an attachment jig. One of the two pieces of denim is attached to an abrader via a urethane foam sheet that has a thickness of 3 mm and a diameter of 38 mm. The first synthetic leather is rubbed 250 times while a load of 12 kPa is applied to the abrader in a Lissajous pattern shown in FIG. 1. The piece of denim attached to the abrader is replaced by another piece of denim, and the first synthetic leather is further rubbed 250 times in the same pattern. After that, the first synthetic leather is detached from the martindale testing machine, and dried by being placed in an environment of 20° C. and 65% RH for 1 hour. In this way, a second synthetic leather is obtained.

In the synthetic leather according to the present embodiment, the color difference between the first synthetic leather and the second synthetic leather, or in other words, the first color difference $\Delta E1^*$ between before and after the stain adhesion test is 5 or less. That is, the adhesion of stains is suppressed even when the synthetic leather has been subjected to an abrasion test in which the anti-stain layer is exfoliated. The first color difference $\Delta E1^*$ may be 4.5 or less.

Figure 1:
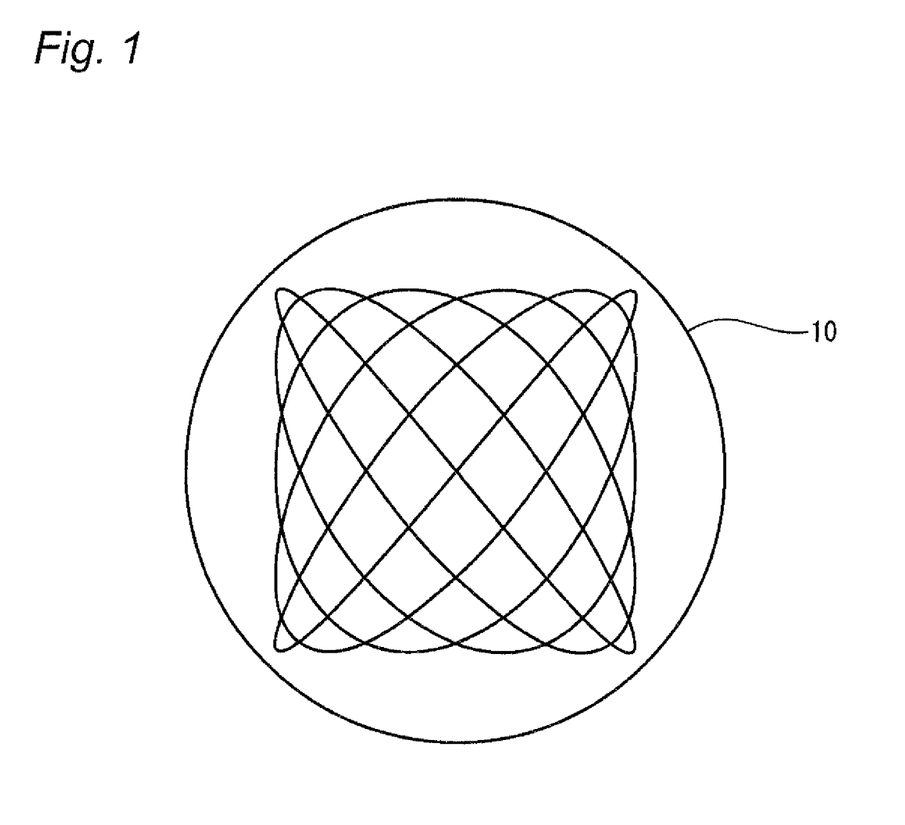
FIG. 1 is a plan view showing an example of a Lissajous pattern.

The Lissajous pattern is a planar figure obtained by combining two single vibrations that vibrate in directions perpendicular to each other. Specifically, the Lissajous pattern is a pattern obtained by changing appropriately input amplitude ratio (A/B), frequency ratio (n:m) and phase difference (δ), with the horizontal axis being represented by A cos (nt) and the vertical axis being represented by B cos (mt+δ). The Lissajous pattern shown in FIG. 1 is obtained when A/B=1, n:m=5:6, and δ=90°. For convenience, the outer edge of the first synthetic leather is also shown in FIG. 1. However, the rubbing pattern is not limited thereto.

Stain removal test. The second synthetic leather obtained in the stain adhesion test is fixed to a crockmeter testing machine conforming to JIS L 0849, and rubbed 10 times by using an abrader to which a piece of wet cotton cloth is attached at a cycle of 60 times/min under a load of 9 N with an abrasion distance of 100 mm. In this way, a third synthetic leather in which at least a portion of stain has been removed is obtained.

Specifically, the stain removal test is performed in the manner described below.

One mL of distilled water is dripped onto two pieces of cut cotton cloth (for example, cotton shirting #3 conforming to JIS L 0803) each having a 50×50 mm square shape, and left for 10 seconds. The second synthetic leather is attached to a crockmeter testing machine conforming to JIS L 0849 (for example, 670 HD CROCKMASTER, available from James Heal Co.) by using a double-sided adhesive tape. One of the two pieces of cut cotton cloth is attached to an abrader. The second synthetic leather is rubbed 5 times at a cycle of 60 times/min with an abrasion distance of 100 mm while a load of 9 N is applied to the abrader. The piece of cotton cloth attached to the abrader is replaced with another piece of cotton cloth, and the second synthetic leather is further rubbed 5 times. In this way, a third synthetic leather is obtained.

In the synthetic leather according to the present embodiment, the color difference between the first synthetic leather and the third synthetic leather, or in other words, a second color difference $\Delta E2^*$ of the synthetic leather between before the stain adhesion test and after the stain removal test may be 3 or less. That is, a stain of the synthetic leather is easily removed even after the synthetic leather is subjected to an abrasion test in which the anti-stain layer is exfoliated. The second color difference $\Delta E2^*$ may be 2.7 or less.

The color of the synthetic leather is not particularly limited. Because a stain is unlikely to adhere to the anti-stain layer of the present embodiment, even when the synthetic leather has a pale color, the original color can be maintained over a long period of time. The L* value of the synthetic leather may be 60 or more, 70 or more, or 80 or more. Also, the L* value of the synthetic leather may be 99 or less, or 96 or less. As used herein, the L* value indicates the lightness of color (brightness), and may take a value of 0 to 100. The greater the L* value, the brighter the color.

Colorimetry. The L* value and each color difference ($\Delta E^*$) of the synthetic leather are measured in the manner described below.

Using a spectrocolorimeter (for example, Color I 5DV available from X-Rite Inc., light source C), each of the synthetic leather, the first synthetic leather, the second synthetic leather, and the third synthetic leather is subjected to colorimetry by performing measurement at four places, and the average value is obtained. L* value, a* value, and b* value are expressed by the obtained average value of each synthetic leather. The average value is rounded off to the second decimal place.

Each color difference (ΔE*) is calculated from the average values of the first synthetic leather, the second synthetic leather, and the third synthetic leather. Specifically, the color difference (ΔE*) is obtained from the equation given below using the values of L* value, a* value and b* value in the Lab color system. Note that (L1*, a1*, b1*) are measurement values of one leather to be compared, and (L2*, a2*, b2*) are measurement values of the other leather.

$$\Delta E'' = \sqrt{((L2^* - L1^*)^2 + (a2^* - a1^*)^2 + (b2^* - b1^*)^2)}$$

The reason why the anti-stain properties are maintained is considered to be that, as described above, the silicon-containing compound does not easily bleed out from the anti-stain layer as compared with the coating layer that contains a fluorine resin. For this reason, the synthetic leather according to the present embodiment may have the following features.

Bleed-Out Acceleration Test. A synthetic leather is fixed to a crockmeter testing machine conforming to JIS L 0849, and subjected to 50 double rubs at a cycle of 60 times/min under a load of 9 N with an abrasion distance of 100 mm by using an abrader to which a tricot knitted fabric made from a black dope-dyed polyester yarn is attached.

In the test, the bleed-out of materials that constitute the anti-stain layer is accelerated through rubbing. The smaller the color difference of the tricot knitted fabric between before and after rubbing, the more difficult the materials that constitute the anti-stain layer bleed out. Among the materials that constitute the anti-stain layer, the silicon-containing compound most easily bleeds out. That is, it can be said that the smaller the color difference of the tricot knitted fabric between before and after rubbing, the more the bleed-out of the silicon-containing compound is suppressed. In the case where the synthetic leather according to the present embodiment is used, the color difference of the tricot knitted fabric between before and after rubbing (third color difference ΔE3*) is, for example, 1.5 or less. The third color difference ΔE3* may be 1 or less.

Specifically, the bleed-out acceleration test is performed in the manner described below.

A test piece of synthetic leather having a width of 50 mm and a length of 130 mm is attached to a crockmeter testing machine (for example, 670 HD CROCKMASTER, available from James Heal Co.) by using a double-sided adhesive tape. An abrader is covered with a 50×50 mm square shaped piece of tricot knitted fabric made from a black dope-dyed polyester yarn, and fixed with an attachment jig. The test piece of the synthetic leather is subjected to 50 double rubs at a cycle of 60 times/min with an abrasion distance of 100 mm while applying a load of 9 N to the abrader.

The tricot knitted fabric is made using, for example, a 28 gauge tricot knitting machine by introducing the same black dope-dyed polyester yarn (for example, WY-Z available from San-Etsu Co. Ltd., 84 dtex/36f) from guide bars L1, L2 and L3. The knit density is 49±2 courses/25.4 mm, 38±1 wales/25.4 mm, and the knit structure is, for example, as follows.

Knit Structure
L1: 1-0, 2-3, 1-0, 2-3, 4-5, 3-2, 4-5, 3-2, 1-0
L2: 4-5, 3-2, 4-5, 3-2, 1-0, 2-3, 1-0, 2-3, 4-5
L3: 1-0, 3-4, 1-0, 3-4

The color difference of the tricot knitted fabric between before and after rubbing is calculated in the same manner as described above.

The substrate is not particularly limited, and may be selected as appropriate according to the application of the synthetic leather. For example, as the substrate, a fabric such as a woven fabric, a knitted fabric, or a non-woven fabric, natural leather (including split leather), or the like may be used. The substrate may be colored with a dye or a pigment. The type of dye or pigment is not particularly limited.

The type of fiber used to make the fabric is not particularly limited. As the fiber, a conventionally known fiber such as a natural fiber, a regenerated fiber, a semi-synthetic fiber, or a synthetic fiber may be used. These are used alone or in a combination of two or more. From the viewpoint of strength and processability, the fabric may be made from a synthetic fiber, in particular, a polyester fiber.

The thickness of the substrate is not particularly limited either, and may be set as appropriate according to the application of the synthetic leather. In the case where, for example, the synthetic leather is used as a car seat cover, the mass of the substrate per unit area may be, for example, 150 $g/m^2$ or more and 350 $g/m^2$ or less, or 260 $g/m^2$ or more and 320 $g/m^2$ or less.

The skin layer is disposed on at least one main surface of the substrate to protect the substrate.

The skin layer is formed using, for example, a resin. From the viewpoint of the adhesion to the anti-stain layer and the texture, the skin layer may be formed using a polyurethane resin. The skin layer may be composed of a single resin layer, two resin layers of the same type of resin, or two resin layers of different types of resins.

The polyurethane resin used to form the skin layer is not particularly limited. Examples of the polyurethane resin include a polyether polyurethane resin, a polyester polyurethane resin, a polycarbonate polyurethane resin, an acrylic polyurethane resin, and the like. These are used alone or in a combination of two or more. From the viewpoint of flame resistance, durability and light resistance, a polycarbonate polyurethane resin may be used. The form of polyurethane resin is not particularly limited, and may be selected as appropriate according to the application of the synthetic leather. The polyurethane resin may be a solvent-free polyurethane resin, a hot-melt polyurethane resin, a solvent-based polyurethane resin or an aqueous polyurethane resin, or may be a one-pack type or two-pack type curable polyurethane resin.

The thickness of the skin layer may be, for example, 20 μm or more and 50 μm or less, or 25 μm or more and 40 μm or less. When the thickness of the skin layer is 20 μm or more, a homogenous layer is easily obtained, and protection performance is easily exhibited. Furthermore, the skin layer is easily processed to have an uneven surface (grain pattern), and the design properties are enhanced. When the thickness is 50 μm or less, the skin layer is unlikely to be coarse and hard, and the deterioration in the texture of the synthetic leather is further suppressed.

The anti-stain layer contains a base resin, and the base resin has a silicon atom and a unit derived from a compound that has a urethane bond.

The silicon atom is derived from, for example, a silicon-containing compound.

The silicon-containing compound may be, for example, silicone. As used herein, silicone is a general term for compounds that have a siloxane bond (—Si—O—Si—) in its main chain. Examples of the silicone include a straight silicone that has a methyl group or a phenyl group bonded to silicon, a modified silicone that has a functional group bonded to silicon other than the methyl group and the phenyl group, a copolymer of a polyorganosiloxane and a polymerizable monomer, and the like.

Examples of the straight silicone include dimethyl silicone (polydimethylsiloxane), methyl phenyl silicone, methyl hydrogen silicone, and the like. Examples of the modified silicone include an amino-modified silicone, an epoxy-modified silicone, a carboxy-modified silicone, a carbinol-modified silicone, a methacryl-modified silicone, a mercapto-modified silicone, a phenol-modified silicone, a hetero-functional groups-modified silicone, a polyether-modified silicone, a methylstyryl-modified silicone, an alkyl-modified silicone, a higher fatty acid ester-modified silicone, and the like. Examples of the copolymer of a polyorganosiloxane and a polymerizable monomer include a copolymer of a polydimethylsiloxane and a poly(meth) acrylate such as polymethyl methacrylate, and the like.

The silicone may be dimethyl silicone from the viewpoint of versatility, or may be a copolymer of a polydimethylsiloxane and a poly(meth)acrylate from the viewpoint of water resistance and oil resistance.

The silicone may be a modified silicone from the viewpoint of easily maintaining the anti-stain properties. A modified silicone is easily chemically bonded to another material that forms the anti-stain layer, and thus bleed-out is likely to be suppressed. In particular, the silicone may be a polyether-modified silicone, or a modified silicone that has a carboxy group and/or a hydroxyl group (including a phenolic hydroxyl group).

The anti-stain layer may contain a fluorine atom. However, the proportion of the fluorine atom to the silicon atom contained in the anti-stain layer:fluorine atom/silicon atom atomic ratio is 0.01 or less. The amount of fluorine atom may be a detection limit amount or less.

The base resin further contains a unit derived from a compound that has a urethane bond. The unit may be derived from a polyurethane resin. The polyurethane resin is not particularly limited, and examples include the same polyurethane resins as those that can be used to form the skin layer. In particular, a polycarbonate polyurethane resin or an acrylic polyurethane resin may be used. The acrylic polyurethane resin is a polymer compound that has a urethane bond and an (meth)acryloyl group, and can be obtained by, for example, copolymerizing a polyol, an isocyanate compound and a (meth)acrylate.

The base resin may further contain another unit. From the viewpoint of easily forming a dense anti-stain layer, the other unit may be an acrylic resin-derived unit. The acrylic resin-derived unit may be chemically bonded to a modified silicone that has a functional group. The amount of acrylic resin in the anti-stain layer is not particularly limited.

The acrylic resin is not particularly limited. Examples of the acrylic resin include: a polymer obtained from acrylic acid, methacrylic acid, or a derivative thereof; a copolymer obtained from two monomers or more of acrylic acid and methacrylic acid, or a derivative thereof; and a modified product thereof. Examples of the monomer derivative include: alkyl acrylates such as methyl acrylate, ethyl acrylate, propyl acrylate, butyl acrylate, isobutyl acrylate, and 2-ethylhexyl acrylate; alkyl methacrylates such as methyl methacrylate, ethyl methacrylate, propyl methacrylate, butyl methacrylate, isobutyl methacrylate, and 2-ethylhexyl methacrylate; hydroxy group-containing acrylates such as 2-hydroxyethyl acrylate, 2-hydroxypropyl acrylate, and 4-hydroxybutyl acrylate; hydroxy group-containing methacrylates such as 2-hydroxyethyl methacrylate, 2-hydroxypropyl methacrylate, and 4-hydroxybutyl methacrylate; multifunctional methacrylates such as ethylene glycol dimethacrylate, diethylene glycol dimethacrylate, triethylene glycol dimethacrylate, polyethylene glycol dimethacrylate, neopentyl glycol dimethacrylate, dipropylene glycol dimethacrylate, polypropylene glycol dimethacrylate, 1.3-butanediol dimethacrylate, trimethylolethane trimethacrylate, trimethylolpropane trimethacrylate, and tetramethylolmethane tetramethacrylate; and the like.

The thickness of the anti-stain layer is not particularly limited. The thickness T of the anti-stain layer may be, for example, 0.6 µm or more, or 1.2 µm or more. The thickness T of the anti-stain layer may be 11 µm or less, or 8 µm or less. When the thickness T of the anti-stain layer is 0.6 µm or more, the anti-stain layer is unlikely to be cracked, and thus anti-stain performance is easily exhibited.

The thickness T of the anti-stain layer can be calculated from a cross section of the synthetic leather in the thickness direction. The cross section is observed using a scanning electron microscope (for example, scanning electron microscope S-3000N available from Hitachi High-Technologies Corporation), thickness measurement is performed at ten arbitrarily selected places, and the average thereof is defined as the thickness of the anti-stain layer.

The anti-stain layer may have an uneven surface (grain pattern). In this case, the synthetic leather has a real leather-like appearance. According to the present embodiment, even when the anti-stain layer has an uneven surface, excellent anti-stain properties are maintained. The uneven surface of the anti-stain layer may be formed to, for example, follow the uneven surface of the skin layer.

In the anti-stain layer, the ratio $T_1/T_2$ of thickness $T_1$ of the anti-stain layer at a projecting portion and thickness $T_2$ of the anti-stain layer at a recess portion may be 0.02 to 1.5, or 0.05 to 1. When the ratio $T_1/T_2$ is within in the above range, the anti-stain layer is unlikely to be cracked, and thus anti-stain performance is easily exhibited. Also, the uneven surface (grain pattern) is clearly formed, and thus the design properties are enhanced.

In the case where the anti-stain layer has an uneven surface, the thickness $T_1$ of the anti-stain layer at a projecting portion and the thickness $T_2$ of the anti-stain layer at a recess portion are calculated in the manner described below, and the average value thereof may be defined as the thickness T of the anti-stain layer. The thickness ratio $T_1/T_2$ is the ratio of $T_1$ and $T_2$ calculated above.

A cross section of the synthetic leather in the thickness direction is observed using a scanning electron microscope at a magnification of 5000 by focusing on one arbitrarily selected projecting portion. Thickness measurement is performed at two places on the projecting portion, and the average value of the measured thickness values is defined as the thickness at the projecting portion in the observed range. This operation is performed at a total of ten places by focusing on different projection portions within the same observed range. The average value of the thickness values obtained at ten places is defined as the thickness $T_1$ of the anti-stain layer at a projecting portion. The thickness $T_2$ of the anti-stain layer at a recess portion is calculated in the same manner by changing the projecting portions to recess portions.

The anti-stain layer may contain optional components such as a thickener, a leveling agent, an antioxidant, a light resistance enhancing agent, an antifoaming agent, and a gloss adjusting agent, as needed. The anti-stain layer may contain a conventionally known an anti-stain agent other than the silicon-containing compound. Examples of the anti-stain agent include a fluorine-containing compound, wax, and the like. The fluorine-containing compound is used such that the proportion of fluorine atom to silicon atom: fluorine atom/silicon atom atomic ratio is 0.01 or less.

The synthetic leather may have a third resin layer, in addition to the skin layer and the anti-stain layer. The third resin layer is disposed, for example, between the substrate and the skin layer. The third resin layer can be formed by applying a solution containing a polymer compound (for example, a conventionally known polyurethane resin, or a copolymer thereof) to the substrate, or impregnating the substrate with the solution, and dry solidifying or wet solidifying it. The mass of the third resin layer per unit area may be, for example, $200\pm20$ g/m².

Figure 2:
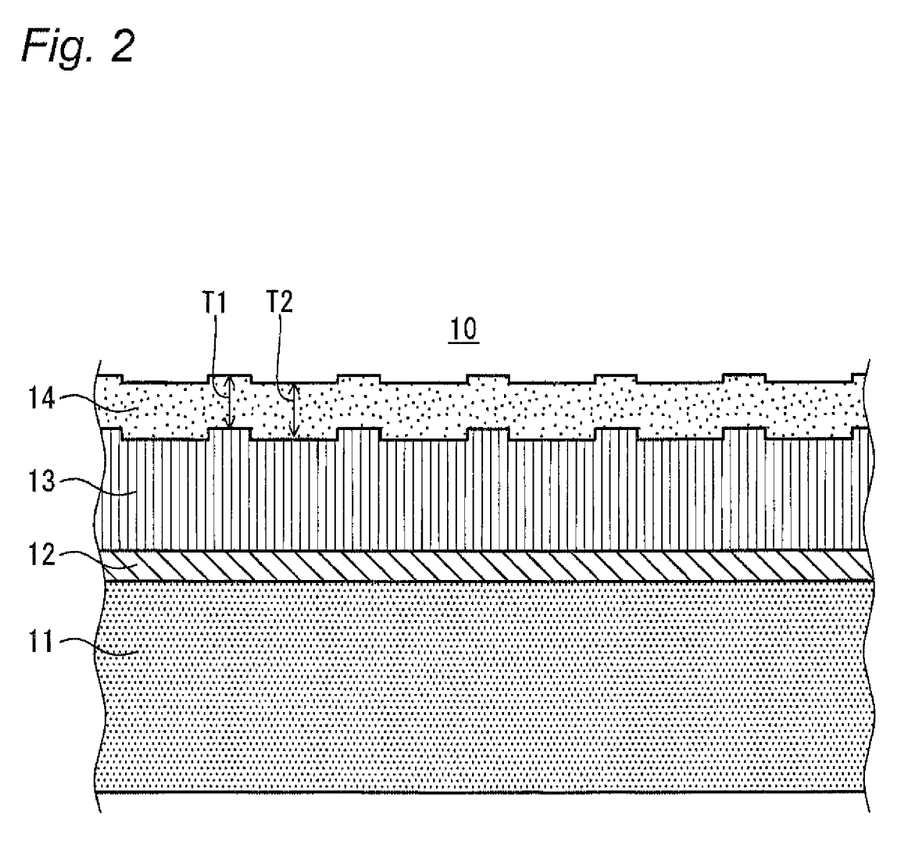
FIG. 2 is a cross-sectional view schematically showing a portion of a synthetic leather according to an embodiment of the present invention.

FIG. 2 is a cross-sectional view schematically showing a portion of the synthetic leather according to the present embodiment. A synthetic leather 10 includes a substrate 11, a skin layer 13 disposed on one main surface of the substrate 11, and an anti-stain layer 14 disposed to cover the skin layer 13. In FIG. 2, an adhesive layer 12 is provided between the substrate 11 and the skin layer 13, but the configuration is not limited thereto. Furthermore, in FIG. 2, the skin layer 13 and the anti-stain layer 14 have an uneven surface. However, the configuration is not limited thereto.

Figure 3:
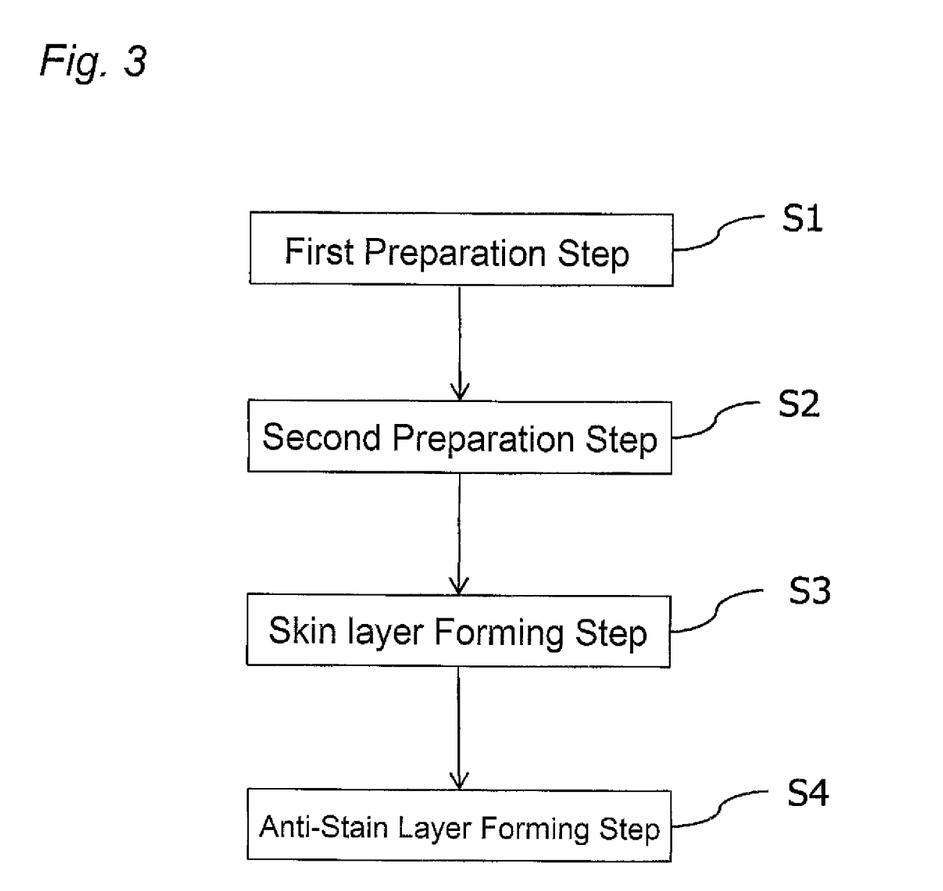
FIG. 3 is a flowchart illustrating a method for producing a synthetic leather according to an embodiment of the present invention.

The synthetic leather according to the present embodiment is produced by, for example, a method including: a first preparation step (S1) of preparing a substrate and a skin layer resin composition; a second preparation step (S2) of preparing an anti-stain layer resin composition; a skin layer forming step (S3) of forming a skin layer containing a skin layer resin composition on one man surface of the substrate; and an anti-stain layer forming step (S4) of forming an anti-stain layer containing the anti-stain layer resin composition to cover the skin layer. The anti-stain layer resin composition contains a raw resin that contains a compound that has an urethane bond, a silicon-containing compound, and a cross-linking agent that bonds the raw resin and the silicon-containing compound. FIG. 3 is a flowchart illustrating the method for producing a synthetic leather according to the present embodiment.

(1) First Preparation Step

A substrate and a skin layer resin composition as described above are prepared.

The skin layer resin composition is not particularly limited, and may be selected from among the polyurethane resins listed above.

(2) Second Preparation Step

An anti-stain layer resin composition is prepared.

The anti-stain layer resin composition contains a raw resin that contains a compound that has a urethane bond, a silicon-containing compound as described above, and a cross-linking agent that bonds the raw resin and the silicon-containing compound. The anti-stain layer resin composition contains, for example, a silicon-containing compound (hereinafter referred to as "first silicon-containing compound") that is reactive with a cross-linking agent, and the cross-linking agent is reactive with a raw resin. Accordingly, in the anti-stain layer, the first silicon-containing compound is chemically bonded to the raw resin via the cross-linking agent, and a base resin is thereby formed. As a result of the first silicon-containing compound being bonded to the raw resin, the anti-stain properties are maintained over a long period of time. The cross-linking agent does not necessarily react with the raw resin and the silicon-containing compound and form a residue between the raw resin and the silicon-containing compound, and the cross-linking agent may be a material (for example, a catalyst) that accelerates bonding between the raw resin and the silicon-containing compound.

The raw resin may be selected from among the polyurethane resins listed above, and may contain any of the acrylic resins listed above.

A silicon-containing compound that has an inorganic main chain and an organic side chain has low compatibility with the raw resin, and is therefore likely to be present on a surface of the anti-stain layer that is opposite to the skin layer. Also, a silicon-containing compound is prone to aggregation. However, with the use of the cross-linking agent, even when the first silicon-containing compound is present on the surface of the anti-stain layer, the bleed-out of the first silicon-containing compound is suppressed. Furthermore, because the aggregation of the first silicon-containing compound is suppressed, the first silicon-containing compound is uniformly provided in the anti-stain layer, and thus the anti-stain properties are enhanced.

The cross-linking agent that can be chemically bonded to the first silicon-containing compound and the raw resin is not particularly limited, and may be selected as appropriate according to the functional group contained in the first silicon-containing compound and the raw resin. Examples of the cross-linking agent include a compound (hereinafter referred to as "carbodiimide cross-linking agent") that has a carbodiimide group (—N=C=N—), an isocyanate cross-linking agent, an epoxy resin cross-linking agent, and the like. In particular, in the case where the first silicon-containing compound is a modified silicone that has a carboxy group or a hydroxyl group (including a phenolic hydroxyl group), from the viewpoint of ease of chemical bonding, a carbodiimide cross-linking agent may be used.

The carbodiimide cross-linking agent may have two or more carbodiimide groups. Examples of the carbodiimide cross-linking agent include: aromatic polycarbodiimides such as poly(4,4'-diphenylmethane carbodiimide), poly(p-phenylene carbodiimide), poly(m-phenylene carbodiimide), poly(diisopropylphenyl carbodiimide), poly(triisopropylphenyl carbodiimide); alicyclic polycarbodiimides such as poly(dicyclohexylmethane carbodiimide); aliphatic polycarbodiimides such as poly(diisopropyl carbodiimide), and the like. These are used alone or in a combination of two or more.

In the case where the skin layer contains a polycarbonate polyurethane resin, the carbodiimide group contained in the carbodiimide cross-linking agent may react with, for example, the carboxyl group of the polycarbonate urethane resin contained in the skin layer and form an N-acylurea that has a three-dimensional cross-linked structure. With this configuration, the adhesion between the anti-stain layer and the skin layer is improved, and the anti-stain properties are more easily maintained.

The amount of the first silicon-containing compound in the anti-stain layer resin composition is not particularly limited. Considering the anti-stain performance, the amount of the first silicon-containing compound may be 10 parts by mass or more and 40 parts by mass or less, or 15 parts by mass or more and 30 parts by mass or less relative to 100 parts by mass of the raw resin.

The amount of the cross-linking agent in the anti-stain layer resin composition is not particularly limited. The amount of the cross-linking agent may be 0.1 mass % or more and 10 mass % or less, or 2 mass % or more and 7 mass % or less of the anti-stain layer resin composition. As a result of the cross-linking agent being contained in an amount within the above-described range, the cross-linking agent easily reacts with the first silicon-containing compound, the anti-stain properties are easily maintained, and a situation is suppressed in which the anti-stain layer becomes coarse and hard.

The form of the carbodiimide cross-linking agent is not particularly limited. From the viewpoint of environmental impact, the carbodiimide cross-linking agent may be water soluble or water dispersible (emulsion). The form of the raw resin is not particularly limited. From the viewpoint of environmental impact, the raw resin may be in the form of emulsion.

The anti-stain layer resin composition may contain a second silicon-containing compound that is not bonded to the cross-linking agent. The second silicon-containing compound may be chemically bonded to the raw resin. The amount of the second silicon-containing compound contained in the anti-stain layer resin composition is not particularly limited as long as the effects of the present embodiment are not impaired. The silicon atom contained in the anti-stain layer of the synthetic leather includes a silicon atom derived from the first silicon-containing compound, and may include a silicon atom derived from the second silicon-containing compound.

(3) Skin Layer Forming Step

A skin layer that contains the skin layer resin composition is formed on one main surface of the substrate.

The method for forming the skin layer is not particularly limited, and a coating method or a laminate method may be used.

In the case of the coating method, for example, the skin layer resin composition is applied to one main surface of the substrate by using a known apparatus such as a knife coater, a comma coater, a roll coater, a die coater or a lip coater, and thereafter dried to form a skin layer.

In the case of the laminate method, the skin layer resin composition is deposited on release paper, and the obtained resin film is laminated on one main surface of the substrate. The release paper may be processed to have an uneven surface. As the laminate method, a known method such as, for example, transfer, thermal fusion, thermal compression bonding, attachment with an adhesive is used. In the case where an adhesive is used, the adhesive is not particularly limited, and a known adhesive can be used. Examples of the adhesive include an acrylic resin, a urethane resin, a silicone resin, a polyolefin resin, and the like.

(4) Anti-Stain Layer Forming Step

An anti-stain layer that contains the anti-stain layer resin composition is formed to cover the skin layer.

The method for forming the anti-stain layer is not particularly limited, either. For example, any of the coating methods listed above is used.

EXAMPLES

Hereinafter, the present invention will be described in further detail by way of examples. However, the present invention is not limited to the examples given below. First, test methods will be described.

(A) Abrasion Test

A circular test piece of synthetic leather that had a diameter of 150 mm was overlaid on a urethane foam that had been cut to have the same size as the test piece and had a thickness of 10 mm (20% compression stress: 0.79 to 1.08 $N/cm^2$, and density: 0.02±0.002 $g/cm^2$), and attached to a T-type plane abrasion testing machine (available from Daiei Kagaku Seiki Mfg. Co., Ltd.) by using a double-sided adhesive tape. At this time, the urethane foam was placed between the test piece of synthetic leather and the testing machine. An abrader of the testing machine was covered with a piece of cotton cloth (No. 6 canvas), and fixed with an attachment jig. The test piece of synthetic leather was subjected to 10000 double rubs at a cycle of 60 times/min with an abrasion distance of 140 mm while applying a load of 19.6 N to the abrader.

(B) Stain Adhesion Test

Two pieces of denim (2550Y, available from Testfabrics, Inc.) that had been cut to have a diameter of 40 mm were placed on the bottom of a beaker filled with distilled water and immersed for 30 seconds. Water droplets on the pieces of denim taken out from the beaker were lightly wiped off with a pulper such that the water content of the two pieces of denim was adjusted to 65±2 mass %.

Next, the synthetic leather that had undergone the abrasion test (first synthetic leather) was fixed to a test table of a martindale testing machine (available from, for example, Groz Beckert Japan K. K.) conforming to ISO 12947-1 by using an attachment jig. One of the two pieces of denim was attached to an abrader via a urethane foam sheet having a thickness of 3 mm and a diameter of 38 mm. The first synthetic leather was rubbed 250 times while a load of 12 kPa was applied to the abrader in a Lissajous pattern shown in FIG. 1. The piece of denim attached to the abrader was replaced with another piece of denim, and the first synthetic leather was rubbed 250 times in the same pattern. After that, the first synthetic leather was detached from the martindale testing machine, and dried by being left in an environment of 20° C. and 65% RH for 1 hour.

(C) Stain Removal Test 1 mL of distilled water was dripped onto two pieces of cut cotton cloth (for example, cotton shirting #3 conforming to JIS L 0803) each having a 50×50 mm square shape, and left for 10 seconds.

The synthetic leather (second synthetic leather) that had undergone the stain adhesion test was attached to a crockmeter testing machine conforming to JIS L 0849 (670 HD CROCKMASTER, available from James Heal Co.) by using a double-sided adhesive tape. A piece of cotton cloth as described above was attached to an abrader. The second synthetic leather was rubbed 5 times at a cycle of 60 times/min with an abrasion distance of 100 mm while applying a load of 9 N to the abrader. The piece of cotton cloth attached to the abrader was replaced with another piece of cotton cloth, and the second synthetic leather was further rubbed 5 times to form a third synthetic leather.

(D) Bleed-Out Acceleration Test

A piece of synthetic leather with a width of 50 mm and a length of 130 mm was attached to a crockmeter testing machine conforming to JIS L 0849 (670 HD CROCKMASTER, available from James Heal Co.) by using a double-sided adhesive tape. An abrader was covered with a 50×50 mm square piece of tricot knitted fabric made from a black dope-dyed polyester yarn, and fixed with an attachment jig. The synthetic leather was subjected to 50 double rubs at a cycle of 60 times/min with an abrasion distance of 100 mm while applying a load of 9 N to the abrader.

The tricot knitted fabric was made using a 28 gauge tricot knitting machine by, introducing the same black dope-dyed polyester yarn (WY-Z available from San-Etsu Co. Ltd., 84 dtex/36f) from guide bars L1, L2 and L3. The knit density was 49±2 courses/25.4 mm, 38±1 wales/25.4 mm, and the knit structure was, for example, as follows.

Knit Structure

L1: 1-0, 2-3, 1-0, 2-3, 4-5, 3-2, 4-5, 3-2, 1-0

L2: 4-5, 3-2, 4-5, 3-2, 1-0, 2-3, 1-0, 2-3, 4-5

L3: 1-0, 3-4, 1-0, 3-4

The colorimetry and the color difference calculation were performed in the manner described below.

Using a spectrocolorimeter (Color I 5DV available from X-Rite Inc., light source C), each of the synthetic leather, the first synthetic leather, the second synthetic leather, the third synthetic leather, and the black solution-dyed tricot knitted fabric before and after the bleed-out acceleration test was subjected to colorimetry by performing measurement at four places. Then, the average values for L* value, a* value, and b* value of each synthetic leather were obtained. Each average value was rounded off to the second decimal place. Using these average values, each color difference (ΔE*) was calculated.

Example 1

(I) Preparation of Substrate

A light beige tricot knitted fabric (polyester fiber, with a mass per unit area of 174 g/m$^2$) was prepared as a substrate.

(II) Preparation of Skin layer Resin Composition 40 parts by mass of dimethylformamide was added to 100 parts by mass of polycarbonate polyurethane resin to adjust the viscosity to about 2,000 mPa·s (B-type viscometer, rotor: No. 3, 10 rpm, 23° C.). In this way, a skin layer resin composition was prepared. At this time, a pigment was added to adjust the skin layer to have a desired color.

(III) Preparation of Anti-Stain Layer Resin Composition

The following materials were prepared.
Formulation 1

1) 20 parts by mass of raw resin containing an acrylic polyurethane resin and an acrylic resin 2) 4.5 parts by mass of first silicon-containing compound (a modified silicone having a hydroxy group and a phenolic hydroxyl group)

3) 1.2 parts by mass of cross-linking agent (carbodiimide cross-linking agent)

4) 0.9 parts by mass of thickener (urethane molecular association thickener)

5) 1 part by mass of leveling agent (polyether-modified silicone surfactant)

6) 0.1 parts by mass of antifoaming agent (polyether-modified silicone surfactant)

Note that the raw resin further contained a second silicon-containing compound (straight silicone) and a gloss adjusting agent (porous silica, 2.7 mass %).

The raw resin and the first silicon-containing compound were mixed to obtain a mixture. The thickener, the leveling agent and the antifoaming agent were added to the mixture and mixed. After that, the cross-linking agent was added to the mixture and mixed, and thereby an anti-stain layer resin composition was prepared. The viscosity of the anti-stain layer resin composition was 1,250 mPa·s (BH-type viscometer, rotor: No. 3, 10 rpm, 23° C.).

(IV) Formation of Skin Layer

The obtained skin layer resin composition was applied to release paper having an uneven surface by using a comma coater, and heated by using a drier at 130° C. for 2 minutes. A resin film was thereby formed. The thickness of the resin film was 30 μm.

An adhesive (polycarbonate polyurethane resin) was applied to the surface of the resin film by using a comma coater, and dried by using a drier at 100° C. for 1 minute. The resin film was laminated on the substrate, with the resin film surface to which the adhesive was applied facing the substrate, and then pressed under a load of 392.3 kPa for 4 seconds. After that, the release paper was removed, and a skin layer was thereby formed on one main surface of the substrate.

(V) Formation of Anti-Stain Layer

The obtained anti-stain layer resin composition was applied to the surface of the skin layer by using a reverse coater, and dried by using a drier at 130° C. for 1 minute and 30 seconds. A synthetic leather was thereby obtained. The thickness T of the anti-stain layer was 5.4 μm. The anti-stain layer had an uneven surface, and the ratio T1/T2 of thickness T1 of the anti-stain layer at a projecting portion and thickness T2 of the anti-stain layer at a recess portion was 0.6. In the anti-stain layer, no fluorine atom was detected, and the fluorine atom/silicon atom atomic ratio was 0.01 or less.

(VI) Evaluation

The obtained synthetic leather was subjected to the above-described tests (A) to (D), and each color difference was calculated. The results are shown in Table 1. The L* value of the synthetic leather obtained in Example 1 was 87.1. The color difference ΔE* between the synthetic leather and the piece of denim used in the stain adhesion test (B) in a dried state was 63.46.

Comparative Example 1

A synthetic leather was produced and evaluated in the same manner as in Example 1, except that instead of the step (III) of preparing an anti-stain layer resin composition, a step (iii-1) of preparing an undercoating resin composition and a comparative resin composition A was performed in the manner described below, and in the step (V) of forming an anti-stain layer, the anti-stain layer was formed by using the comparative resin composition A after an undercoating layer was formed by using the undercoating resin composition. The results are shown in Table 1. The undercoating layer was formed to improve abrasion resistance.

(iii-1) Preparation of Resin Composition

The following materials were prepared for the undercoating resin composition.
Formulation 2

1) 16.5 parts by mass of urethane resin (polycarbonate urethane)

2) 1 part by mass of leveling agent (polyether-modified silicone surfactant)

3) 8 parts by mass of water 4) 0.8 parts by mass of cross-linking agent (carbodiimide cross-linking agent)

The urethane resin, the leveling agent and water were mixed, and the cross-linking agent was added to the mixture and mixed. An undercoating resin composition was thereby prepared. The viscosity of the undercoating resin composition was 250 mPa·s (BH-type viscometer, rotor: No. 3, 10 rpm, 23° C.).

The following materials were prepared for the comparative resin composition A.
Formulation 3

1) 20 parts by mass of fluorine-based resin (a copolymer of tetrafluoroethylene and hexafluoropropylene)

2) 12 parts by mass of cross-linking agent (isocyanate cross-linking agent)

3) 0.5 parts by mass of antifoaming agent (polyether-modified silicone surfactant)

4) 0.6 parts by mass of foam stabilizer (polyether-modified silicone surfactant)/

5) 1 part by mass of leveling agent (polyether-modified silicone surfactant)

6) 1.5 parts by mass of silicone compound aqueous dispersion (acryl-modified silicone)

7) 1.8 parts by mass of thickener (urethane molecular association thickener)

The antifoaming agent, the foam stabilizer, the leveling agent, the silicone compound aqueous dispersion and the thickener were added to the fluorine-based resin and mixed, and the cross-linking agent was further added to the mixture and mixed. The comparative resin composition A was thereby prepared. The viscosity of the comparative resin composition A was 3,000 mPa·s (BH-type viscometer, rotor: No. 3, 10 rpm, 23° C.).

(V) Formation of Anti-Stain Layer

The obtained undercoating resin composition was applied to the surface of the skin layer by using a reverse coater, and dried by using a drier at 130° C. for 1 minute and 30 seconds. An undercoating layer covering the skin layer was thereby formed.

Next, the obtained comparative resin composition A was applied to the surface of the undercoating layer by using a reverse coater, and dried by using a drier at 130° C. for 1 minute and 30 seconds. An anti-stain layer was thereby formed. In this way, a synthetic leather was obtained. The thickness T of the anti-stain layer was 4.7 μm. The anti-stain layer had an uneven surface, and the ratio T1/T2 of thickness T1 of the anti-stain layer at a projecting portion and thickness T2 of the anti-stain layer at a recess portion was 0.49. In the anti-stain layer, the fluorine atom/silicon atom atomic ratio significantly exceeded 0.01. The L* value of the obtained synthetic leather was 88.1. The color difference ΔE* between the synthetic leather and the piece of denim used in the stain adhesion test (B) in a dried state was 64.07.

Comparative Example 2

A synthetic leather was produced and evaluated by forming an anti-stain layer in the same manner as in Example 1, except that instead of the step (III) of preparing an anti-stain layer resin composition, a step (iii-2) of preparing a comparative resin composition B was performed in the manner described below, and in the step (V) of forming an anti-stain layer, the comparative resin composition B was used instead of the anti-stain layer resin composition. The thickness T of the anti-stain layer was 10.9 μm. The anti-stain layer had an uneven surface, and the ratio T1/T2 of thickness T1 of the anti-stain layer at a projecting portion and thickness T2 of the anti-stain layer at a recess portion was 0.52. In the anti-stain layer, no fluorine atom was detected. The fluorine atom/silicon atom atomic ratio was 0.01 or less. The L* value of the obtained synthetic leather was 87.7. The color difference ΔE* between the synthetic leather and the piece of denim used in the stain adhesion test (B) in a dried state was 62.78.

(iii-2) Preparation of Comparative Resin Composition B
The following materials were prepared.
Formulation 4

1) 28 parts by mass of raw resin containing an acrylic polyurethane resin and an acrylic resin 2) 4 parts by mass of polycarbonate urethane resin 3) 3 parts by mass of silicon-containing compound (polydimethylsiloxane)

4) 11.5 parts by mass of water 5) 2 parts by mass of cross-linking agent (carbodiimide cross-linking agent)

6) 0.9 parts by mass of thickener (urethane molecular association thickener)

7) 1 part by mass of leveling agent (silicone surfactant)

8) 0.1 parts by mass of antifoaming agent (mineral oil type antifoaming agent)

Note that the raw resin further contained a second silicon-containing compound (straight silicone).

The raw resin and the silicon-containing compound were mixed to obtain a mixture. The thickener, the leveling agent and the antifoaming agent were added to the mixture and mixed. After that, the cross-linking agent was further added to the mixture and mixed. A comparative resin composition B was thereby prepared. The viscosity of the comparative resin composition B was 1,250 mPa·s (BH-type viscometer, rotor: No. 3, 10 rpm, 23° C.).

TABLE 1

| | First color difference ΔE1* (stain adhesion resistance) | Second color difference ΔE2* (stain removability) | Third color difference ΔE3* (bleed-out resistance) |
|---|---|---|---|
| Example 1 | 4.21 | 2.57 | 0.35 |
| Comparative Example 1 | 7.66 | 4.33 | 0.31 |
| Comparative Example 2 | 5.02 | 1.30 | 4.08 |

INDUSTRIAL APPLICABILITY

Because anti-stain properties are maintained over a long period of time, the synthetic leather according to the present invention is preferably used as an automotive interior material such as a car seat, or an industrial material such as an interior upholstery material.

The invention claimed is:

1. A synthetic leather comprising:
a substrate;
a skin layer that is disposed on one main surface of the substrate; and
an anti-stain layer that is disposed to cover the skin layer, wherein the anti-stain layer contains a base resin;
the base resin comprises a silicon atom and a unit derived from a polyurethane resin;
in the anti-stain layer, a fluorine/silicon atomic ratio is 0.01 or less; and
wherein the synthetic leather has a stain adhesion resistance characterized by a first color difference ΔE1* of 5 or less between a first synthetic leather and a second synthetic leather measured by using a spectrocolorimeter, wherein the first synthetic leather is the synthetic leather after abrading by subjecting the synthetic leather to 10000 double rubs at a cycle of 60 times/min under a load of 19.6 N with an abrasion distance of 140 mm in accordance with JASO M 403/88, and the second synthetic leather is a stained synthetic leather obtained by fixing the first synthetic leather to a martindale testing machine conforming to ISO 12947-1 and rubbing the first synthetic leather 500 times under a load 12 kPa by using an abrader to which a piece of denim whose water content has been adjusted to 65±2 mass % and that has a color difference ΔE* from the synthetic leather of 50 or more is attached;
wherein the base resin further includes an acrylic resin-derived unit;
wherein the silicon atom is a silicon atom derived from a modified silicone having a hydroxyl group and a phenolic hydroxyl group.

2. The synthetic leather in accordance with claim 1, wherein the synthetic leather has a stain removability characterized by a second color difference ΔE2* between the first synthetic leather and a third synthetic leather measured by using a spectrocolorimeter is 3 or less, wherein the third synthetic leather is obtained by fixing the second synthetic leather to a crockmeter testing machine conforming to JIS L 0849, and rubbing the second synthetic leather 10 times at a cycle of 60 times/min under a load of 9 N with an abrasion distance of 100 mm by using an abrader to which a piece of wet cotton cloth is attached, the third synthetic leather therefore having at least a portion of stain removed.

3. The synthetic leather in accordance with claim 1,
wherein the synthetic leather has a bleed-out resistance characterized by a third color difference ΔE3* between a tricot knitted fabric made from a black dope-dyed polyester yarn and an abraded tricot knitted fabric measured by using a spectrocolorimeter is 1.5 or less, the abraded tricot knitted fabric being obtained by fixing the synthetic leather to a crockmeter testing machine conforming to JIS L 0849 and subjecting the synthetic leather to 50 double rubs at a cycle of 60 times/min under a load of 9 N with an abrasion distance of 100 mm by using an abrader to which the tricot knitted fabric made from a black dope-dyed polyester yarn is attached.

4. A method for producing a synthetic leather, the method comprising:
a first preparation step of preparing a substrate and a skin layer resin composition;
a second preparation step of preparing an anti-stain layer resin composition;
a skin layer forming step of forming a skin layer that contains the skin layer resin composition on one main surface of the substrate; and
an anti-stain layer forming step of forming an anti-stain layer that contains the anti-stain layer resin composition to cover the skin layer, wherein the anti-stain layer composition contains a base resin;
the base resin comprises a silicon atom and a unit derived from a polyurethane resin;
in the anti-stain layer, a fluorine/silicon atomic ratio is 0.01 or less; and
wherein the synthetic leather has a stain adhesion resistance characterized by a first color difference AE1* of 5 or less between a first synthetic leather and a second synthetic leather measured by using a spectrocolorimeter, wherein the first synthetic leather is the synthetic leather after abrading by subjecting the synthetic leather to 10000 double rubs at a cycle of 60 times/min under a load of 19.6 N with an abrasion distance of 140 mm in accordance with JASO M 403/88, and the second synthetic leather is a stained synthetic leather obtained by fixing the first synthetic leather to a martindale testing machine conforming to ISO 12947-1 and rubbing the first synthetic leather 500 times under a load 12 kPa by using an abrader to which a piece of denim whose water content has been adjusted to 65±2 mass % and that has a color difference ΔE* from the synthetic leather of 50 or more is attached;
wherein the base resin further includes an acrylic resin-derived unit;
wherein the silicon atom is a silicon atom derived from a modified silicone having a hydroxyl group and a phenolic hydroxyl group.

5. The method for producing a synthetic leather in accordance with claim 4,
wherein the silicon atom and the unit derived from a polyurethane resin are cross-linked by a cross-linking agent that has a carbodiimide group.

6. The synthetic leather in accordance with claim 1,
wherein the polyurethane resin is a polycarbonate polyurethane resin or an acrylic polyurethane resin.

7. The synthetic leather in accordance with claim 1,
wherein the silicon atom and the unit derived from a polyurethane resin are cross-linked by a cross-linking agent that has a carbodiimide group.

\* \* \* \* \*